Nov. 30, 1971
C. L. BOYD
3,623,835
GAS FLOWMETER
Filed June 11, 1969
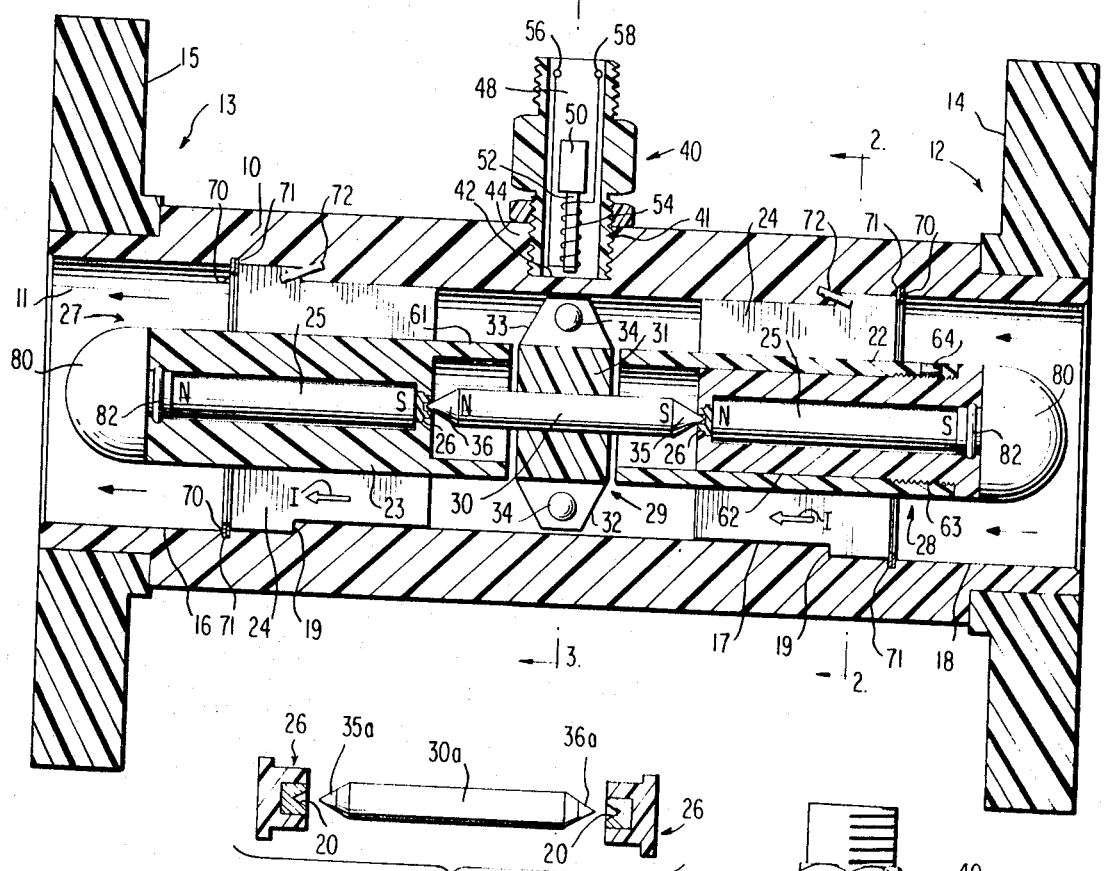
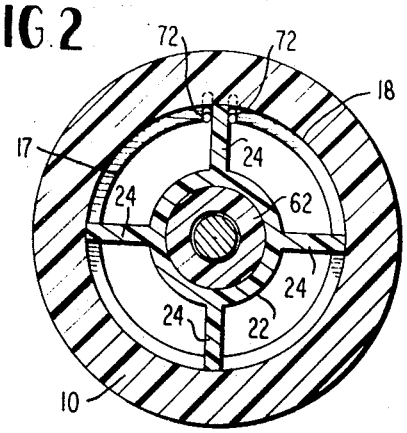
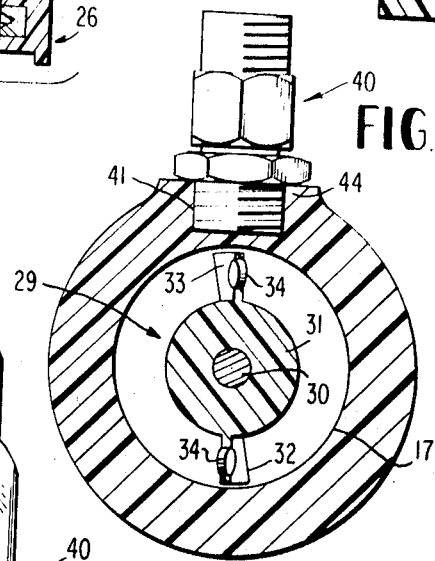
INVENTOR
CHARLES L. BOYD
BY
Burns, Doane, Benedict, Swecker & Mathis
ATTORNEYS United States Patent Office 3,623,835
Patented Nov. 30, 1971

3,623,835
GAS FLOWMETER
Charles L. Boyd, Duncan, Okla., assignor to
Halliburton Company, Duncan, Okla.
Filed June 11, 1969, Ser. No. 832,343
Int. Cl. G01f 1/06
U.S. Cl. 73—231
9 Claims

ABSTRACT OF THE DISCLOSURE

A magnetic flowmeter of the turbine type wherein the rotor blades are substantially diamagnetic except for the inclusion of magnetic slugs in the tips thereof. The rotor is mounted within the flowmeter housing by means of a combination jewel and magnetic bearing at each end of the rotor axle. The bearings are statically held within the flowmeter by cross-vane assemblies which engage the flowmeter housing and are held against rotation by a pair of dowel pins. One of the bearings may be axially adjustable with respect to the cross-vane assembly and rotor axle to provide for optimum bearing clearances.

BACKGROUND OF THE INVENTION

This invention relates to improvements in flowmeters of the type used to measure the flow of fluids, such as gases or liquids flowing through a pipeline or the like and relates to application Ser. No. 782,800 and application Ser. No. 709,735 both of common assignment herewith.

In particular, this invention relates to a flowmeter having a fluid passageway in which a turbine vane rotor is mounted. The rotor axle extends longitudinally within the flowmeter and is journaled within a pair of static bearing assemblies. Conventionally, the bearings comprise a radial sleeve bearing surface and an axial roller bearing surface. The bearings may be lubricated by the fluid flowing through the flowmeter.

The internal parts of flowmeters of the type described may be conventionally retained in the housing by snap rings received within grooves cut into the internal walls thereof at opposite ends of the rotor supporting vane assemblies. The vane assemblies are customarily inserted in the flowmeter housing both upstream and downstream of the rotor and perform the dual function of supporting the rotor bearings and insuring a desirable flow characteristic past the rotor blades.

Rotation of the rotor blades may be detected by a magnetic pickup. A typical pickup comprises a magnet positioned normally to the axis of the flowmeter housing. The magnet produces lines of magnetic flux that pass through the non-magnetic flowmeter housing to establish a magnetic field through which the flowmeter rotor turns. The magnetic field is established in all plane throughout an arc of 360° about the end of the pickup unit. Rotation of the blades of the flowmeter rotor into and out of proximity with the pickup unit modifies the strength of the magnetic field by changing the permeability of the magnetic flux path. The change in magnetic field strength induces a voltage in a stationary detection coil placed in the field externally of the fluid passageway. The signal produced in the pickup can then be amplified and used to indicate the flow rate through the meter.

A representative flowmeter of the foregoing type is described in U.S. Pat. No. 3,164,020 to Groner et al.

Although fluid flowmeters of the type described are advantageous, in structure and operation, room for further improvement in the art exists.

At low flow rates, particularly when a low density fluid such as gas is being measured, the friction of conventional sleeve and ball bearing assemblies may introduce error into the meter readings. Therefore, it has frequently been the prior practice to designate a minimum rotor speed necessary merely to overcome the rotor bearing friction. In order to overcome the frictional loss in the bearings, it has further been a prior practice to introduce a large number of vanes on the rotor, thus utilizing a larger portion of the fluid passing through the meter to produce a driving torque. It will be appreciated, however, that with an increase in the number of rotor blades, the rotor assembly necessarily increases in weight and therefore creates greater frictional drag in the bearings.

In this same light, while the fluid flowing through a meter measuring liquid flow may lubricate the rotor bearings, in a gas flowmeter, bearing lubrication by this means is nonexistent.

Further, it will be readily realized that the accuracy of a flowmeter instrument depends to a substantial degree upon the mounting of the rotor, both as to radial alignment of the axis and the longitudinal location within the bore of the meter body. It is therefore desirable to have a minimum tip clearance between the rotor and the housing bore so that a full representative cross section of fluid flowing through the meter will impinge upon and transmit torque to the rotor blades. Prior meters, however, have been limited to reasonable machinist dimensions of tip clearance because of bearing misalignment and play.

As stated previously, conventional magnetic pickup devices produce lines of magnetic flux that extend in all planes throughout an arc of 360° around the permanent magnet in the pickup mechanism. The magnetic material of the flowmeter rotor is thus exposed to lines of magnetic flux in positions other than and in addition to the position of immediate proximity to the magnet. The lines of magnetic flux may thus be continuously cut by the magnetic material of the rotating flowmeter rotor. The energy consumed by cutting these flux lines tends to magnetically load the turbine rotor and impair the response of the flowmeter. Increasing the number of vanes of the rotor therefore not only produces a more weighty rotor which increases, to a degree, the friction produced in the bearings, but further produces an increase in the number of rotor blades cutting the magnetic lines of flux, thus increasing the magnetic loading of the rotor and further impairing response of the flowmeter.

In addition, the bearings for previously known flowmeters have not been adjustable. Therefore a dimensional allowance for component cooperation is required which necessarily dictates a substantial tip clearance reducing the sensitivity to full flow response and also pickup sensitivity.

A further problem in some flowmeters of the type described is the undesirable characteristic of the toric turbulence-controlling vane assemblies to rotate when subjected to a high velocity fluid stream.

SUMMARY OF THE INVENTION

It is therefore a general object of the invention to provide a flowmeter intended to obviate or minimize the disadvantages of the type previously noted.

It is a particular object of the invention to provide a cross vane assembly within a fluid flow housing which will resist rotation.

It is a further object of the invention to provide a rotor support assembly within a fluid flow housing which may be adjustable.

It is still a further object of the invention to provide a flowmeter hub to support an internal bearing.

It is a further object of the invention to precisionally support a rotor within a housing, therefore enabling a reduction in rotor tip clearance.

It is another object of the invention to provide a flowmeter which will minimize lubricating or non-lubricated bearing frictional losses.

It is yet another object of the invention to provide a magnetic pickup fluid flowmeter which will facilitate magnetic pickup of the rotor rotation and minimize rotor magnetic drag.

It is a still further object of the invention to provide a fluid flowmeter with a minimum amount of turbulence past the rotor pickup station.

It is yet another object of the invention to provide a fluid flowmeter with increased bearing life.

A preferred embodiment of the invention, intended to accomplish at least some of the foregoing objects comprises a non-magnetic housing having a tubular passageway therethrough. A turbine rotor is positioned centrally within said passageway and has blades of non-magnetic material carrying magnetic slugs near the tips thereof.

The rotor is carried by a longitudinally extending permanently magnetic axle member having opposite ends that may be substantially conically shaped. The axle is supported at its opposite ends by a combination of conically recessed jewel bearing pad and stator magnet that includes an attractive magnetic field on the rotor axle. Therefore, each stator magnet attracts the rotor away from the other stator member and toward a jewel bearing pad mounted on the ends of the stator magnets.

The jewel and magnetic bearings are axially and radially positioned at each end of the flowmeter housing by a cross vane assembly which is held against rotation within the housing by a pair of dowel pins juxtaposed to at least one blade in each vane assembly.

In order to optimize axial bearing clearance, one jewel and magnetic bearing may be axially adjustable with respect to its corresponding stator cross-vane assembly.

The drawings:

Further objects and advantages of the invention will become apparent from the following detailed description taken in conjunction with the accompanying drawings, wherein:

FIG. 1 is a side elevational view of the fluid flowmeter having a magnetic pickup and turbine blade rotor held at each end by a combination jewel and magnetic bearing;

FIG. 2 is a fragmentary, cross sectional, vertical elevation view of the fluid flowmeter as viewed along section line 2—2 of FIG. 1;

FIG. 3 is a fragmentary partially sectioned, vertical elevation view of the fluid flowmeter as viewed along section line 3—3 of FIG. 1, showing the pickup means, rotor vane assembly and plugs of magnetic material positioned through each vane assembly;

FIG. 4 is a schematic view of a portion of the magnetic pickup shown in FIG. 1; and FIG. 5 is a side elevational view of an alternative preferred embodiment of a rotor axle having tips of increased wear characteristics.

DESCRIPTION OF THE PREFERRED EMBODIMENTS

Summary

Referring now to the drawings, wherein like numerals designate like parts, and more specifically to FIG. 1, a fluid flowmeter having an elongated tubular body 10 of non-magnetic material is shown. At low internal pressures a rigid plastic material, as shown, may be suitable. However, where high internal pressures are anticipated, the housing 10 may be constructed of a stainless steel or other high strength non-magnetic material. A fluid flow passageway 11 extends axially through the body 10. The upstream end 12 and the downstream end 13 of the housing 10 may have radially extending flanges 14 and 15, welded at the upstream and downstream ends, respectively, for convenient connection into a fluid line (not shown) through which the fluid flow is to be measured.

As best shown in FIGS. 1 and 2, the flow confining passageway 11 is formed to have three concentric bores 16, 17 and 18 which define an internal shoulder portion 19 at each end of the flowmeter passageway. Abutted against the shoulders 19 are a first and second cross vane assembly 28 and 27 having a hub 22 and 23, respectively, and four radially extending vanes 24 for cooperative engagement with the internal bore portions 16, 17 and 18, and shoulder portions 19 of the housing passageway 11.

The upstream and downstream stator vane assemblies each support a combination permanent magnet 25 and jewel 20 bearing, as best seen in FIG. 5.

Journaled for rotation within the bearings is a turbine rotor assembly, as best seen in FIGS. 1 and 3. This assembly has a longitudinally extending axle 30, hub 31 and a first and second rotor vane 32 and 33. Through each rotor vane there is positioned a plug 34 of magnetic material for inducing a signal in a pickup means generally designated 40.

As best seen in FIG. 1, the lower portion 41 of the magnetic pickup unit 40 is threaded into a radially tapped blind opening 42 in the upper portion 44 of the non-magnetic housing 10.

A permanent magnet 50 is mounted in a conventional manner within the cavity 48 of the pickup unit 40. The magnet 50 typically has a pole piece 52 of a reduced diameter. The pole piece 52 extends downwardly toward the housing 10 and is provided with a detection coil 54. The ends of the coil are electrically connected to terminal 56 and 58. The pickup unit 40 is entirely conventional in its construction and its operation and may employ, by way of example, a standard Electro Products Model 3030 pickup element.

The direction of the magnetic field established by the flux emanating from the permanent magnet 50 is illustrated in FIG. 4. The flux extends in all planes throughout an arc of 360° around the lower end of the permanent magnet 52 immersing detection coil 54 in the field established.

The rotor is positioned within the flowmeter passageway 11 so that the rotor vane plugs 34 pass in immediate proximity to the pickup unit 40 for inducing a signal in the pickup means as previously discussed.

The rotor

A preferred embodiment of the flowmeter rotor 29 is best seen in FIGS. 1 and 3. An axle portion 30 of the rotor assembly extends longitudinally and centrally within the flowmeter passage 17. The axle is provided with conical end portions 35 and 36 for the centering reception within a pair of bearings as will be described in detail hereinafter. The axle in a preferred embodiment, shown in FIG. 1, may be constructed of a permanently magnetic material, such as, for example Alnico V. Alternatively, in order to minimize breakage of the tips due to lateral loading, and as best seen in FIG. 5, the tips may be made from a suitably strong, magnetically permeable material, and may be bonded to a permanently magnetic body 30A. To this end, resin bonded carbide tips 35a and 36a will suffice.

Interfering fit, or directly molded around the mangetic axle 30, is a hub member 31 formed from a suitable non-magnetic material which may be, for example, a polycarbonate sold under the trademark Lexan.

Integrally extending from the hub 31 are a pair of blades increase in camber from their base to the tip to produce a desirable torque transfer characteristic. The tips of the blades have been designed to maintain a minimum clearance with the bore 17 of the fluid passageway 11. A minimum tip clearance is desirable, first in order to obtain maximum torque per blade and secondly to insure a characteristic force pattern from fluid flowing along the inner surfaces of the bore.

In the past, typical tip clearances have been limited to approximately .015 inch. This amount of tip clearance was necessary because of the machine tolerances in the bearings. However, the tip clearance of the instant invention may be considerably reduced, as much as 100%, because of the particular bearing construction and molded rotor assembly.

The rotors are further provided with a pair of plugs 34 which are composed of a magnetic material suitable for cooperation with the magnetic pickup 40 to indicate rotation of the rotor. It should be appreciated that first constructing the hub and rotor from a non-magnetic material and secondly utilizing only two rotor vanes will materially reduce magnetic loading of the flowmeter rotor.

The bearings

The bearings, as best seen in FIGS. 1 and 5, comprise an upstream and downstream combination of an elongated permanent magnet 25 and a jewel bearing pad 20 which may be formed from an industrial jewel such as for example, a sapphire. The bearing pad 20 may be surrounded by a non-magnetic support shell 26 which butts directly against magnet 25.

The permanent magnets 25 are axially aligned on an axis which is coincident with the axis of the rotor 30. The poles of the magnet are positioned such that the pole of a stator magnet will be juxtaposed to an opposite pole of the rotor axle magnet. Therefore, lines of flux emanating from the stator or rotor magnet will terminate in a corresponding juxtaposed stator or rotor counterpart of opposite polarity. The lines of flux will therefore tend to draw the corresponding ends of the rotor axle toward the stators and radially-wise, tend to continuously position the rotor axle coincident with the axle of the stator magnets. Therefore, the rotor assembly is at least partially magnetically supported and centered within the flowmeter housing.

Positioned between the rotor axle magnet 30 and each stator magnet 25 is a jewel bearing support 26 carrying a jewel 20. The jewels 20 are generally cylindrical and have a generally flat base portion facing the stator magnet and a conical void portion, as best seen in FIG. 5, dimensioned for the intimate reception of a corresponding tip of the rotor magnet. The jewel bearings complement the radial supporting and positioning of the axle by the magnetic fields and support axial loading of the rotor assembly. It is appreciated that under operating conditions, the magnetic bearings will produce a net axial load on the jewel bearing pad. However, frictional engagement has been minimized by the use of jewel bearings and the reduction of weight in the hub and rotor vane assembly. Further, the net axial load may be compensated for by the torque produced from the decreased tip clearance which in part is possible by the extremely accurate, constantly centering tendencies of the opposite polarity of the magnetic stator and rotor assemblies.

Bearing stator assemblies

The combination magnetic and jewel bearing assembly may be axially positioned within the housing bore 11 by means of an upstream and downstream cross vane assembly 28 and 27 respectively.

The downstream assembly generally indicated as 27 in FIG. 1 comprises a first longitudinally extending nonmagnetic hub 23. The hub intimately surrounds and positions the combination permanent magnet 25 and jewel support 26 for accurate radial alignment within the flowmeter passageway 11.

The hub 23 contains a cylindrical extension or shroud 61 to extend coaxially with, thus overlapping, an end portion of the rotor axle and be radially coincident with the rotor hub 31. This extension maintains a constant flow channel through the metering station minimizing turbulence and preventing the continual impingemental of fluid which may contain an abrasive material against the bearing contact point.

Integral with and surrounding the support assembly hub 23 are four radially extending vanes 24. The vanes serve the dual purpose of spanning the void between the flowmeter passageway and stator hub for concentric support of the hub within the passageway and channelize and normalize toric fluid flow through the metering station. The vanes 24 may be located at 90° intervals about the hub 23 and are provided with notches intermediate the length thereof to cooperate with a shoulder portion 19 in the flowmeter housing 10. The notch and shoulder portion will axially position the stator assembly from movement in the upstream direction and snap rings 70 positioned within a notch 71 in the flowmeter housing 10 will prevent axial movement of the stator assembly in the downstream direction.

As will be recognized, rotation of either the upstream or downstream vane assembly may produce undesirable characteristics in the positioning of the bearing means. Rotation may be eliminated by a pair of dowel pins 72, shown in FIGS. 1 and 2, which extend into the flowmeter housing 10 and snugly engage on opposite sides a vane 24 of the stator assembly. The pins 72 project into the bore of the flowmeter housing but are inclined into the housing shoulder portion 19 so as not to obstruct or protrude into the interbore 17 passageway.

The upstream stator vane assembly 28 is similar in many respects to the downstream assembly 27. However, as best seen in FIGS. 1 and 2, the stator hub assembly 22, instead of intimately contacting the jewel support, and magnetic bearing, comprises a sleeve which surrounds in frictional contact an axially positionable plug 62. The plug 62 intimately surrounds and carries in coaxial alignment with the flowmeter passageway and sleeve 22 the jewel support 26 and magnetic bearing 25. Axial adjustment of the plug 62 with respect to the sleeve 22 is accomplished by the threaded junction 63 of the upstream end of the plug and sleeve. A "keeper" or set screw 64 may be threadedly positioned normally through the sleeve 22 to prevent untimely rotation of the plug 62 within the sleeve.

Each of the hub members 22 and 23 may be provided with a suitable streamlined end cap 80 which may "snap" into engagement with the corresponding hub by means of a snap ring 82, formed integrally with the cap body.

To assemble the flowmeter of the present invention, the downstream stator assembly 27 is slid within the flowmeter bore. The stator vane assembly butts against the passageway shoulder 19. The dowel pins 72 are then positioned within the housing wall to prevent stator rotation as previously discussed. Snap rings 70 are then positioned against the end of the stator assembly thus completing a portion of the installation.

The rotor is next slid into the housing bore 17 through the upstream end 12 of the flowmeter, care being exercised to position the leading edge of the rotor blade upstream. While those skilled in the art will have little trouble recognizing proper orientation of the rotor component, suitable indicia (not shown) may be placed on the rotor hub to indicate orientation of insertion.

The basic assembly operation may then be completed with the insertion of the upstream stator assembly 28. The upstream assembly may be held in position by the dowel pins 72 and snap rings 70 as previously discussed.

A significant aspect of the invention resides in the bearing adjustment provision at this juncture. In this regard, set screw 64 is backed off to allow rotational sliding translation of the plug 62 with respect to the stator hub 22. A fluid stream is directed through the housing. Slack in the bearings is then taken up just enough to eliminate chattering of the rotor assembly. The set screw 64 is then tightened and the assembly is thus adjusted.

In the adjusted posture, with fluid flowing through the meter, the downstream jewel bearing 20 will be receiving an axial and radial load from the rotor axle. The lines of flux of the magnetic bearing will radially supplement the jewel bearing load. The jewel bearing 20 at the upstream end however, may be slightly separated from the rotor axle tip and thus at the upstream end, total radial bearing load may be assumed by the magnetic lines of flux.

The bearing assembly has been described with the rotor and stator magnets oriented such that opposite poles of the magnets are presented at each bearing interface thus the magnetic bearings counter the radial loading of the rotor axle while the downstream jewel axially supports the rotor axle.

While the above magnetic bearing orientation is preferred, it is a further aspect of the invention to reverse the rotor polarity thus utilizing the magnetic fields as the main axial support and the conical jewel surfaces to radially support the rotor axle.

SUMMARY OF THE ADVANTAGES

It will be appreciated by those skilled in the art that the above disclosed fluid flowmeter utilizes a turbine rotor which is substantially diamagnetic having a minimum number of rotor blades to minimize magnetic loading while maintaining balance of the system. Each blade carries a slug of magnetic material near the tip thereof to cooperate with a conventional magnetic pickup to detect rotor rotation without excessive magnetic loading of the flowmeter rotor.

In addition, thermoplastic diamagnetic blades are light in weight and easily molded to precise dimensions. The relatively light rotor assembly may be supported by a combination magnetic and jewel bearing means which may radially center the rotor within the flowmeter housing with extreme precision. Rotor tip clearance may therefore be minimized with a resultant increase in pickup sensitivity.

The stator assemblies may be held in axial engagement within the flowmeter housing and prevented from rotation by dowel pins, thus eliminating costly time spent in accurately grooving notches longitudinally within the flowmeter housing. The stator assemblies also provide a shroud to minimize turbulence past the pickup station and prevent fluid from impinging upon the bearings. The hub of the stator provides a unique housing for an internal bearing.

The combination jewel magnetic bearing assembly of the flowmeter is particularly suited to gas flow measurement by being essentially frictionless and extremely long lived even in the absence of a lubricant. Therefore the response of the rotor at low flow rates may be maximized.

The rotor may be provided with carbide tips to further eccentuate durability. Optimum bearing clearance may be adjusted after the meter is assembled to maximize the above-described desired characteristics, and compensate for manufacturing inaccuracies.

Although the invention is described with reference to preferred embodiments, it will be appreciated by those skilled in the art that additions, deletions, modifications, substitutions and other changes, not specifically described and illustrated in these embodiments may be made which will fall within the purview of the appended claims.

I claim:

1. A device comprising:
    a tubular housing;
    a housing passage extending generally longitudinally of said housing;
    an annular shoulder extending generally transversely of said passage;
    a cross vane assembly positioned within said housing and having a hub and a plurality of vanes extending therefrom for engagement with the passage of said housing; and a pair of pins carried by said housing and operable to engage said cross vane assembly and prevent rotation thereof when fluid flows through said housing;
    said pins extending at least in part generally longitudinally of said passage and intersecting said shoulder; and
    said shoulder and said pins being exposed to a flow of fluid through said passage.

2. A hub assembly for a flowmeter having a rotor assembly, said hub assembly comprising:
    a generally hollow cylindrical body, having one end thereof closed;
    a magnet positioned within said body;
    a selectively removable end cap positioned on the other end of said cylindrical body to retain said magnet within said hub;
    said generally cylindrical body and removable end cap cooperating to isolate said magnet from fluid flowing through and flowmeter; and shroud means extending from said generally cylindrical body;
    said shroud means being operable to radially shield, from flow through said flowmeter, a zone of magnetic interaction disposed between said magnet positioned within said body and a magnet of a rotor assembly disposed adjacent said hub assembly in said flowmeter.

3. A hub as defined in claim 2 wherein:
    said end cap and the cylindrical body of said hub assembly are provided with a compatible peripheral extension and recess respectively, whereby said end may snap fit into engagement with said hub.

4. A fluid flowmeter comprising:
    a housing having a fluid passageway therethrough;
    a rotor having:
        a longitudinally extending axle within said passageway, and
        a plurality of blades generally extending from said axle;
    a first and second bearing means for radially and axially supporting said rotor within said housing;
    a first and second stator assembly for radially and axially supporting said first and second bearing means within said flowmeter housing, each stator having:
        a generally cylindrical hub portion for carrying said bearing means, and
        a plurality of radially extending vane portions for radial engagement with said passageway;
    a first and second stator securing means for preventing rotation of said first and second stator assemblies respectively, said securing means comprising at least one dowel pin extending on each side of at least one vane in each stator assembly and into said housing;
    a pair of annular shoulder means, each extending generally outwardly of said passageway and engaging one of said stator assemblies;
    said dowel pins each extending at least in part generally longitudinally of said passage and intersecting one of said shoulder means; and
    said shoulder means and said pins being exposed to a flow of fluid through said passage; and
    pickup means exterior of said housing for detecting rotation of said flowmeter rotor, whereby said flowmeter is suitable for measuring fluid flow through said passageway.

5. A fluid flowmeter comprising:
    a housing having a tubular passageway therethrough;
    a rotor having:
        a longitudinally extending axle within said passageway, and a plurality of blades generally extending from said axle;
a first combination magnetic and jewel bearing means mounted within said passageway for supporting one end of said rotor axle;
a second combination magnetic and jewel bearing means mounted within said passageway for supporting the other end of said rotor axle; and
a magnetic pickup means mounted on said housing externally of said fluid passageway for detecting the rotation of said rotor blades whereby said flowmeter is suitable for measuring fluid flow through said passageway;
a pair of radially extending cross vane assemblies for supporting said first and said second bearing means within said passageway, said assemblies having radially extending shoulder portions thereupon for engagement with radially recessed shoulders in said housing passageway;
a pair of snap rings for simultaneous engagement with the radial extremities of said vane assemblies and a radial recess within said housing to thereby axially position said vane assemblies against said passageway shoulders;
a pair of dowel pin means associated with each cross vane assembly, said pins of each pair extending on each side of at least one vane in one of said cross vane assemblies and also into said housing to thereby rotationally fix each of said assemblies within said housing;
first and second annular shoulder means extending generally outwardly of said passage, with each such shoulder means engaging one of said cross vane assemblies;
said pins each extending at least in part generally longitudinally of said passageway and intersecting one of said shoulder means; and
said shoulder means and said pins being exposed to a flow of fluid through said passage.

6. A fluid flowmeter as defined in claim 5 further comprising:
a magnet contained in each of said bearing means;
a cylindrical body and removable end cap cooperating to isolate each said magnet from fluid flowing through said flowmeter;
shroud means extending axially of each said cylindrical body;
each said shroud means being operable to radially shield, from flow through said flowmeter, a zone of magnetic interaction between a magnet positioned within a cylindrical body from which each said shroud means extends and said rotor axle; and
means for axially adjusting at least one of said jewel and magnetic bearing means.

7. A fluid flowmeter as defined in claim 6 wherein said adjusting means comprises:
a sleeve member axially fixedly held in alignment with respect to said rotor axle by one of said vane assemblies, and
axially movable means movably supporting one said cylindrical body and its associated magnet within said sleeve member.

8. A fluid flowmeter comprising:
a housing having a smooth bore tubular passageway therethrough;
a rotor centrally mounted with said housing passageway having,
a longitudinally extending axle rod,
a plurality of nonmagnetic blades mounted thereupon for rotation in response to the axial movement of a fluid through said flowmeter, and
a slug of magnetic material mounted through each of said blades near the tip thereof;
a first combination magnetic and jewel bearing means mounted within said passageway for supporting one end of said rotor axle;
a second combination magnetic and jewel bearing means mounted within said passageway for supporting the other end of said rotor axle;
a first cross vane assembly having radially extending arms positioned within and radially engaging the bore of said housing for fixedly positioning said first combination bearing means juxtaposed to and axially in alignment with said one end of said rotor axle;
a second cross vane assembly having radially extending arms positioned within and radially engaging the bore of said housing for positioning said second combination magnetic jewel bearing means juxtaposed to said other end of said rotor axle and axially in alignment with said first bearing means and said rotor axle;
a magnetic pickup means mounted on said housing exteriorally of said tubular passageway for detecting the rotation of said slugs carried on said rotor blades, whereby fluid flow through said passageway can be detected and measured; and
a magnet contained in each of said bearing means;
a cylindrical body and removable end cap cooperating to isolate each said magnet from fluid flowing through said flowmeter;
shroud means extending axially of each said cylindrical body;
each said shroud means being operable to radially shield, from flow through said flowmeter, a zone of magnetic interaction between a magnet positioned within a cylindrical body from which each said shroud means extends and said rotor axle rod.

9. A fluid flowmeter comprising:
a housing having a passageway therethrough; a rotor having,
a longitudinally extending axle within said passageway, and
a plurality of blades extending from said axle;
a first, combination magnetic and jewel bearing means mounted within said passageway for supporting one end of said rotor axle;
a second, combination magnetic and jewel bearing means mounted within said passageway for supporting the other end of said rotor axle;
a magnetic pickup means mounted on said housing externally of said fluid passageway for detecting the rotation of said rotor blades whereby said flowmeter is suitable for measuring fluid flow through said passageway;
first and second stator means disposed in said passageway and providing support, respectively, for said first and second combination magnetic and jewel bearing means;
first and second annular shoulder means, each extending generally outwardly of said passageway and engaging one of said stator means;
first and second dowel pin means extending at least in part generally longitudinally of said passage, intersecting respectively said first and second shoulder means and operable respectively to prevent rotation of said first and second stator means; and
said first and second shoulder means and said first and second pin means being exposed to a flow of fluid through said passageway;
a magnet contained in each of said bearing means;
a cylindrical body and removable end cap cooperating to isolate each said magnet from fluid flowing through said passageway; and
shroud means extending axially of each said cylindrical body;
each said shoud means being operable to radially shield, from flow through said flowmeter, a zone of magnetic interaction between a magnet positioned within a cylindrical body from which each said shroud means extends and said rotor axle.

References Cited

UNITED STATES PATENTS

| | | | |
|---|---|---|---|
| 624,142 | 5/1899 | White | 308—10 |
| 3,164,020 | 1/1965 | Groner et al. | 73—231 |
| 3,195,964 | 7/1965 | Sieurin | 308—10 |
| 3,201,083 | 8/1965 | Schaus | 73—231 |
| 3,433,071 | 3/1969 | Homrig | 73—231 |
| 3,512,851 | 5/1970 | Love | 308—10 |

FOREIGN PATENTS

| | | | |
|---|---|---|---|
| 757,184 | 5/1967 | Canada | 73—231 |

CHARLES A. RUEHL, Primary Examiner

U.S. Cl. X.R.

308—10